Aug. 25, 1959     H. F. TAPP     2,901,567
SWITCH MECHANISM FOR STORAGE TANK LEVEL MEASURING APPARATUS
Filed April 3, 1957     4 Sheets-Sheet 1
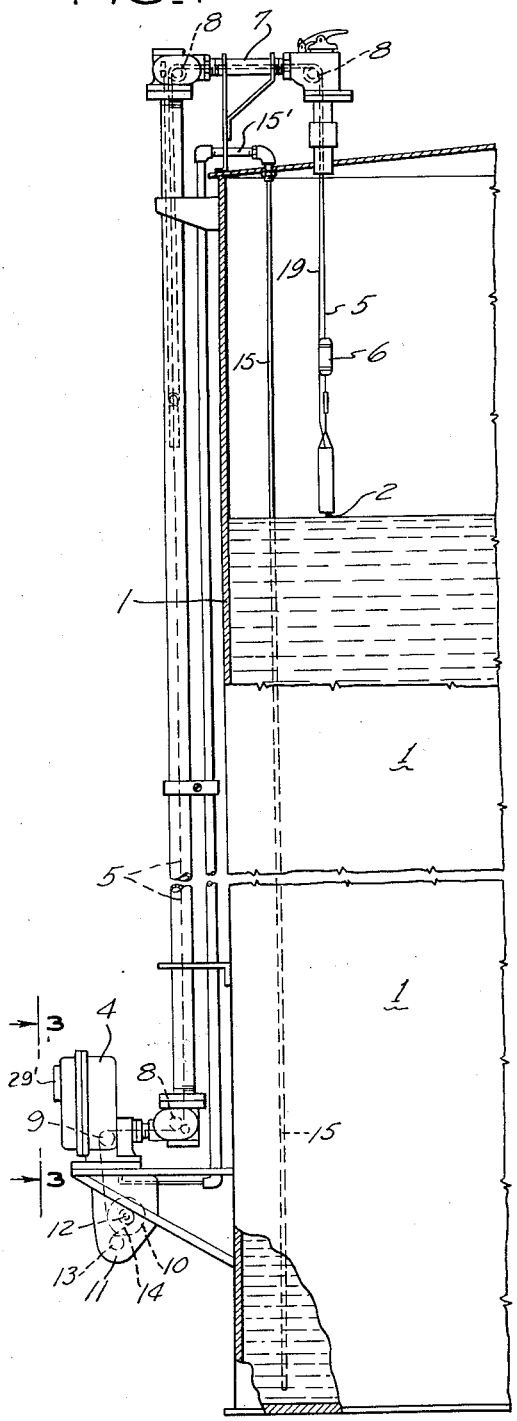
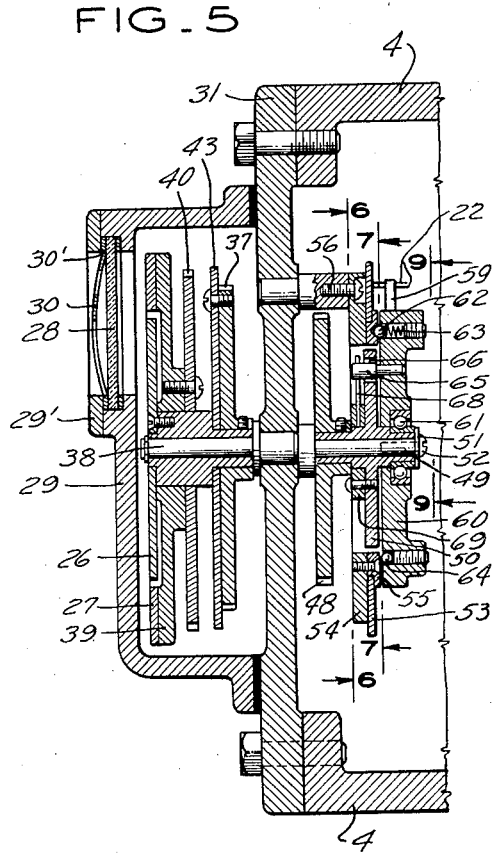
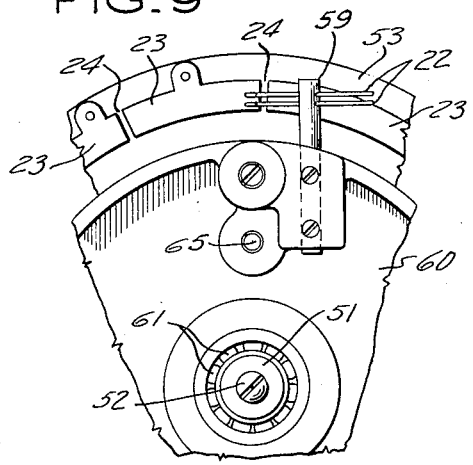
INVENTOR
HARRY F. TAPP
BY Chapin & Neal
ATTORNEYS Aug. 25, 1959  H. F. TAPP  2,901,567
SWITCH MECHANISM FOR STORAGE TANK LEVEL MEASURING APPARATUS
Filed April 3, 1957 4 Sheets-Sheet 2

INVENTOR
HARRY F. TAPP
BY Chapin + Neal
ATTORNEYS

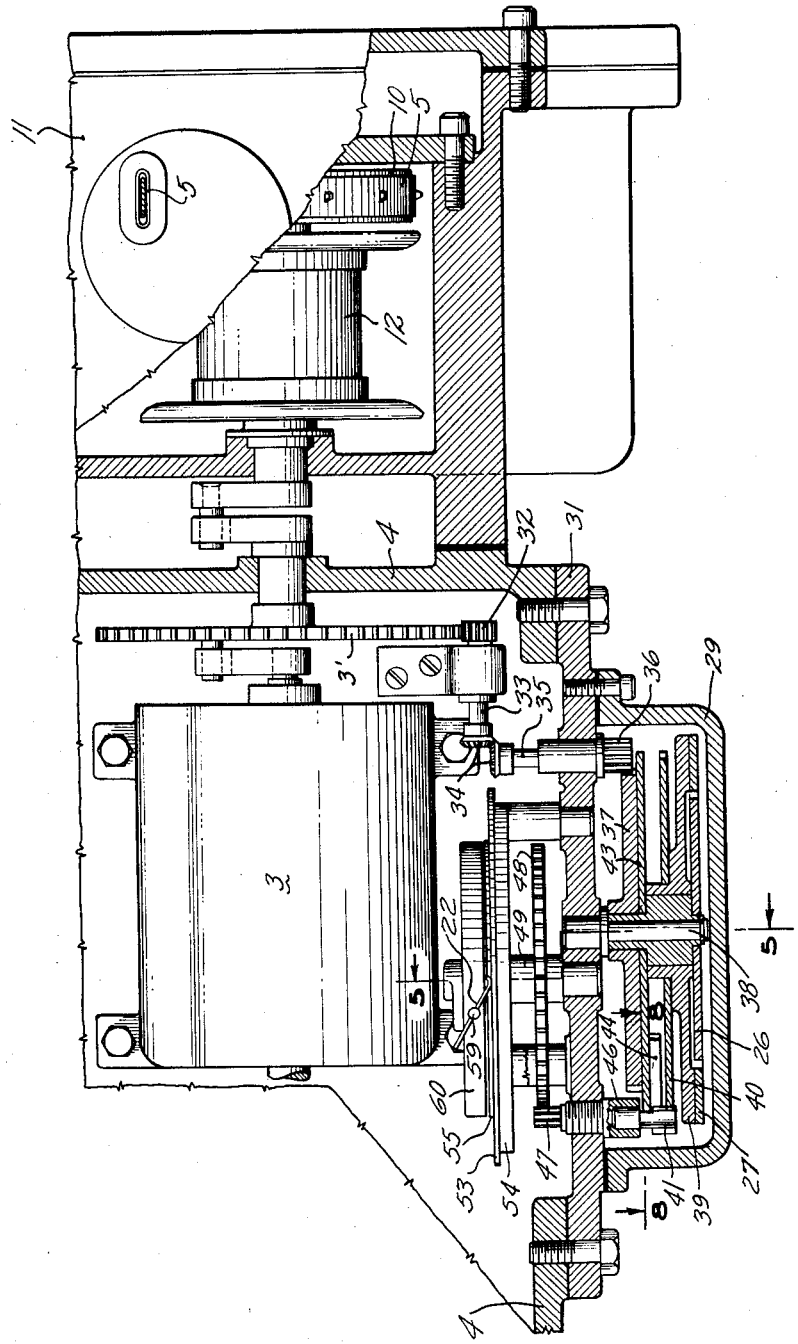

Aug. 25, 1959   H. F. TAPP   2,901,567
SWITCH MECHANISM FOR STORAGE TANK LEVEL MEASURING APPARATUS
Filed April 3, 1957   4 Sheets-Sheet 4

INVENTOR
HARRY F. TAPP
BY Chapin + Neal
ATTORNEYS

United States Patent Office 2,901,567
Patented Aug. 25, 1959

2,901,567

SWITCH MECHANISM FOR STORAGE TANK LEVEL MEASURING APPARATUS

Harry F. Tapp, Longmeadow, Mass., assignor to Gilbert & Barker Manufacturing Company, West Springfield, Mass., a corporation of Massachusetts Application April 3, 1957, Serial No. 650,477

2 Claims. (Cl. 200—65)

This invention relates to improvements in apparatus for measuring the average temperature of liquid in a storage tank and is an improvement in the apparatus disclosed in the Tapp and Robinson Patent No. 2,625,043, granted January 13, 1953, to the assignee of the present invention.

The apparatus of the prior patent utilizes a series of resistors which are of equal resistance and extend from the bottom of the storage tank upwardly, terminating at different levels. These resistors can be selectively connected one at a time in circuit with a measuring instrument which indicates temperature. For any given depth of liquid in the tank, the longest totally immersed resistor having a length nearest to this depth is automatically selected by means actuated by the liquid level-responsive element in the tank.

This invention has for an object the provision of simplified and improved switch mechanism for selectively connecting the temperature-measuring resistors in circuit with the temperature-measuring instrument.

More particularly, the switch mechanism includes a brush engageable with a series of spaced contacts, and the brush and contacts are adapted to be relatively moved by the level-responsive element in the tank, the means for relatively moving the brush and contacts including a resilient driving element adapted to be stressed just before the brush leaves one contact and then released to cause the brush to jump, almost instantaneously, across the space between such contact and the next succeeding one without bridging the gap and without any possibility of dwell between these adjacent contacts.

The invention will be disclosed with reference to the accompanying drawings, in which, Fig. 1 is a small-scale, fragmentary, sectional elevational view of a storage tank equipped with a level-sensing element, temperature-measuring resistors, a servo motor actuated by the level-sensing element and a gauge showing the liquid level;

Fig. 4 is a sectional plan view showing the servo motor and driving connections to the level-measuring gauge and to the switching means for the temperature-measuring apparatus;

Fig. 5 is a sectional view on line 5—5 of Fig. 4 showing the brush carrier with its detent ball and pressure equalizing ball riding on the detent ring or plate;

Fig. 9 is a fragmentary sectional view taken on the line 9—9 of Fig. 5 and showing the brush engaged with a contact of the switching means;

Figure 2:
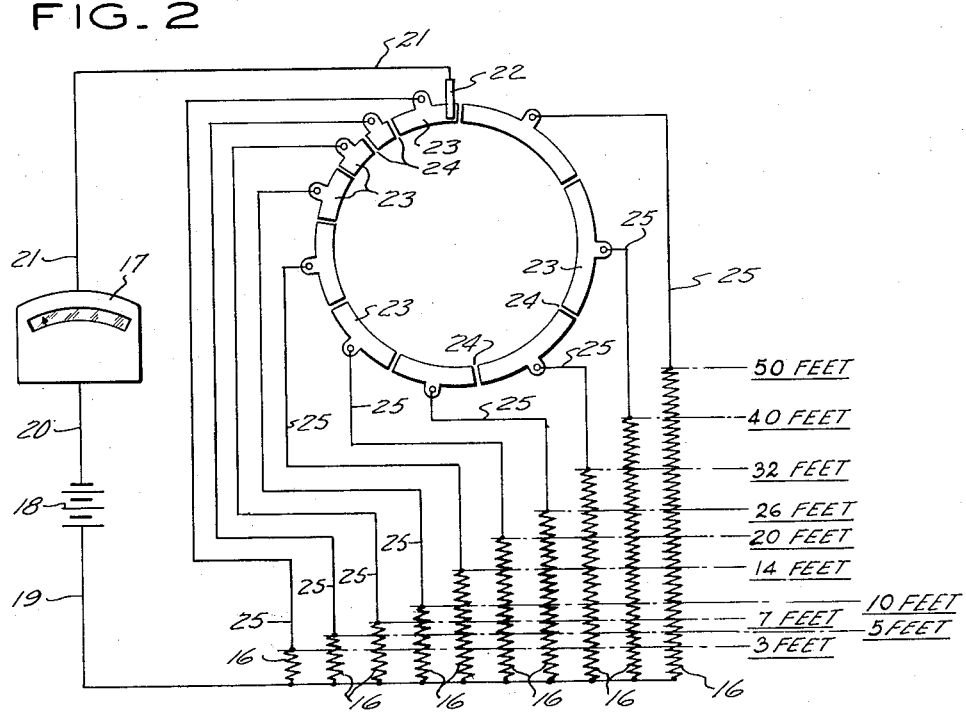
Fig. 2 is a diagrammatical view of the electrical apparatus for measuring the average temperature of the liquid in the tank.

Referring to these drawings and first to Fig. 1 thereof, there is shown a storage tank 1 such as is commonly used in the petroleum industry and which is usually of large diameter, say for example 100 feet, and of substantial height, say for example 60 feet. In this tank is a level-sensing element 2 of any suitable form which actuates a servo-motor 3 (Fig. 4) contained in a housing 4 mounted outside tank 1. This element 2 may for example be constructed and operate as disclosed in the Mesh and Tapp Patent No. 2,682,026, granted June 22, 1954, to the assignee of the present invention. Reference to this patent may be had for a more complete disclosure of this element and the way in which it controls the servo-motor. The element is suspended from tape 5 which carries a weight 6 and extends upwardly through the top of tank 1 and through a conduit 7, mounted exteriorly of the tank, the tape being guided by idler pulleys 8, around a sprocket wheel 9 on the shaft of the servo-motor to a winding drum 10 contained in housing 11 attached to and depending from the housing 4. In housing 11 is a tensioning means comprising a drum 12 fixed to drum 10, and a drum 13 connected by a spring 14 to drum 12. The spring tends to wind up tape 5 when the servo motor 3 raises the level-sensing element while weight 6 tends to lower such element whenever permitted by servo motor 3. As disclosed in said patent servo-motor 3 is actuated in response to variations in the level of liquid in tank 1 to restore the predetermined relationship between the element 2 and the liquid level.

Also mounted in tank 1 is a cable 15 containing a series of resistors used for temperature measurement. This cable extends upwardly through the top of the tank and through a conduit 15′ to the housing 4 for connection to the switching means later to be described. These resistors are shown diagrammatically at 16 in Fig. 2. Each has the same resistance (for example 100 ohms) uniformly distributed throughout its length. The resistors extend upwardly from the bottom of the tank 1 and terminate at different selected levels, as indicated in Fig. 2. The resistors may, for example, be wound like coil springs and then distended to the different lengths required. These resistors are adapted to be connected one at a time in an electrical circuit containing in series a measuring instrument 17, which may be of the milliammeter type with a scale graduated to read in temperatures, as in degrees Fahrenheit, and a suitable power source, such for example, as a battery 18. The lower terminal of each resistor is connected to a wire 19 leading to one terminal of battery 18. The other terminal of the battery is connected by a wire 20 to one terminal of instrument 17 and the other terminal of the latter is connected by a wire 21 to a brush 22 which rides on one or another of a circular series of stationary contacts 23 separated one from another by insulating gap 24. Each contact 23 is connected by a wire 25 to its resistor 16.

In Fig. 2 the brush 22 is shown in zero position. As the level in tank 1 rises brush 22 will move counter-clockwise and traverse the first contact 23. The shortest resistor 16 at a three foot tank level will then be in circuit with the measuring instrument 17. It should be noted that for liquid levels less than three feet this first resistance coil 16 will be partially above the actual liquid level. From three to five feet it will be totally immersed. As indicated by the length of the first contact 23 the three foot level resistance will be utilized for readings up to and including such five foot levels. If the level rises higher than five feet, brush 22 will engage the second contact 23 and bring into circuit the totally immersed five foot resistor 16. The second contact 23 will thus indicate readings at levels from five to seven feet. Thus, as the level rises, different resistors are put in circuit with instrument 17, the arrangement being such that at different levels the longest totally immersed resistor which most nearly corresponds to that level is preferably placed in circuit to give the average temperature over the height of liquid in the tank. On falling of the liquid level, the brush will move clockwise and reverse the procedure described.

Conveniently, the contacts are arranged in a circular series but they need not necessarily be. Also, the brush is rotated while the contacts are stationary but obviously this arrangement could be reversed.

Such temperature measuring resistors 16 operating in a similar manner and one switching means therefor are disclosed in the above named Patent No. 2,625,043. This patent also discloses the spring tensioning mechanism, which herein includes the elements 12, 13 and 14. Reference to this last-named patent may be had for a more complete disclosure of such elements and the average temperature measuring means if necessary or desired.

Figure 3:
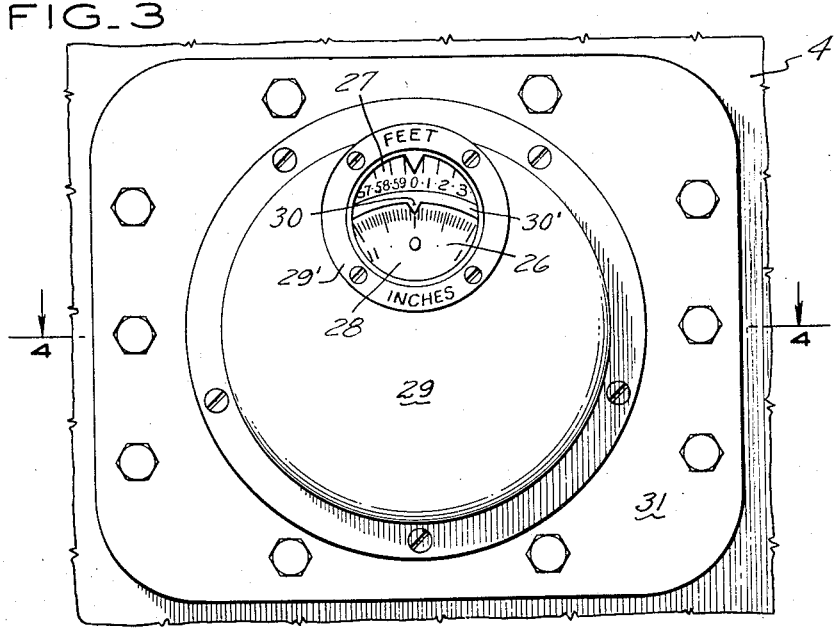
Fig. 3 is a view on line 3—3 of Fig. 1.

Referring next to Figs. 3 and 4, the level gauge comprises a circular dial 26, graduated in inches, and a surrounding annular dial 27, graduated in feet. Portions of both dials are visible through a window 28 in the housing 29 and may be read with reference to the pointer 30. The latter is carried by a ring 30′ mounted outside window 28 and held in place with the latter by a retaining ring 29′. The housing 29 is fixed as indicated to the cover plate 31 of the above described housing for the servo-motor 3. As shown in Fig. 4 the servo-motor 3 has driven by its shaft a gear 3′ which drives a pinion 32 fixed on one end of a short shaft 33 mounted in housing 4. Shaft 33 is connected by bevel gears 34 to a shaft 35, rotatably mounted in a bearing in cover plate 31 and extending into housing 29, where it is provided with a pinion 36. The latter drives a gear 37, the hub of which is fixed to the hub of the inch dial plate 26 (see also Fig. 5). The hub of plate 26 is rotatably mounted on a stud 38 fixed to cover plate 31. The gearing between motor 3 and dial 26 is such that when the tape 5 moves one inch, the one inch graduation of dial 26 will align with pointer 30.

Figure 8:
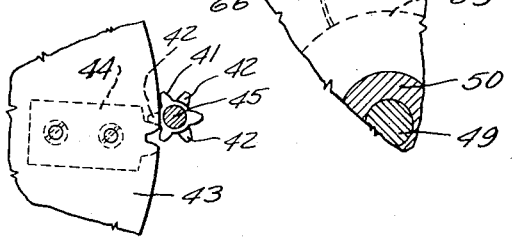
Fig. 8 is a fragmentary sectional view taken on line 8—8 of Fig. 4 showing the geneva drive mechanism.
Figure 10:
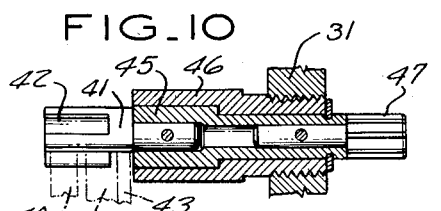
Fig. 10 is an enlarged scale fragmentary section showing details of the geneva drive gear shown by Fig. 4 and Fig. 8.

The annular foot dial 27 is fixed to the front face of a plate 39, the hub of which is rotatably mounted on the hub of the inch dial. Fixed to the rear of face plate 39 is gear 40 having 120 teeth. This gear meshes with the front portion of a pinion 41 having six teeth. The rear portion of this pinion has every other tooth cut away at the root line, leaving three teeth 42 (see Figs. 8 and 10) which are engageable two at a time by a circular plate 43 to hold the pinion against rotation. This plate is fixed to the front face of gear 37 (Fig. 4) and driven thereby. Fixed to this plate 43 is a member 44 (see Fig. 8) having two gear teeth and an intervening space. The plate 43 has a similar space and aligned space to receive tooth 42. Member 44 once each revolution meshes with the six tooth portion of pinion 41 and moves it two teeth, thus moving gear 40 one sixtieth of a revolution, causing the dial 27 to move the distance between two successive one foot graduations. The pinion 41 is fixed to a shaft 45 (Fig. 10) which is rotatably mounted in a bearing 46 in cover plate 31 (see also Fig. 4). On its inner end which extends into the motor housing 4, shaft 45 carries a pinion 47, which meshes with a gear 48 rotatably supported from a stud 49 fixed to cover 31.

A driving plate 50 (Fig. 5) for the brush carrier has its hub rotatably mounted on stud 49 and the hub of gear 48 is fixed to the hub of plate 50. The hub of plate 50 is held against axial displacement between a flange on study 49 and a washer 51 fixed to the stud by a screw 52.

Figure 7:
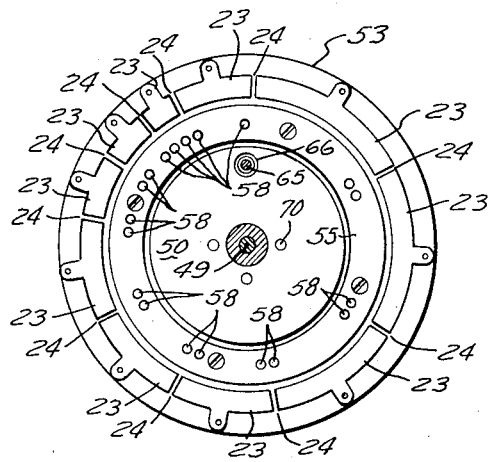
Fig. 7 is a sectional view taken on line 7—7 of Fig. 5 showing the driving means for the brush carrier of the switching means for the temperature-measuring apparatus.

The contact segments 23 are made of very thin metal printed or plated on an annular ring 53 of suitable insulating material. This ring is held flatly against one face of an annular supporting ring 54 by a marginal flange of a track ring 55 which is secured by screws to ring 54. The latter is secured by screws 56 to several posts 57 fixed to cover plate 31. The ring 55 has a plurality of pairs of indentations 58 (see also Fig. 7) therein, the members of each pair being located one on each of the two adjacent ends of two segments 23 and on opposite sides of the insulating gap 24 between such ends. The brush 22 (Figs. 5 and 9) is fixed crosswise in a pin 59, fixed to project radially outward from a circular brush carrier 60 (Figs. 4 and 5) and one end of the brush rides on the contact segments 23. This brush carrier is rotatably mounted by means of a ball bearing 61 on the hub of the driving plate 50. The carrier has a detent comprising a ball 62 forced outwardly by a spring 63 against the annular ring 55, which has therein the described indentations 58. Mounted in carrier 60 at a point diametrically opposite from ball 62 is a screw held ball 64 which also rides on ring 55 inside of indentations 58 and serves to balance the pressure of ball 62 on the ring.

Figure 6:
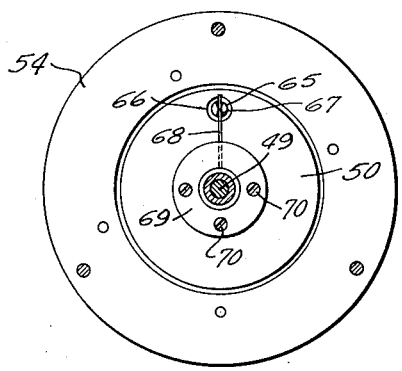
Fig. 6 is a sectional view taken on the line 6—6 of Fig. 5 and showing the gearing for actuating the foot dial of the level gauge.

The brush carrier 60 is driven from plate 50 by engagement with a pin 65 fixed to the carrier and projecting rearwardly therefrom through a hole 66 in plate 50. This hole is larger in diameter than the pin. The latter has a slot 67 (see Fig. 6) in its outer end that receives the outer end of a spring wire 68, which is fixed to and extends radially outward from a collar 69 that is secured by screws 70 to plate 50.

Figure 12:
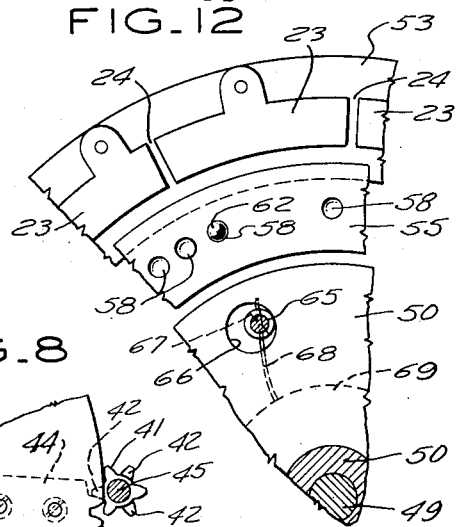
Fig. 12 is a view taken similarly to Fig. 10 but showing the parts in another position.
Figure 13:
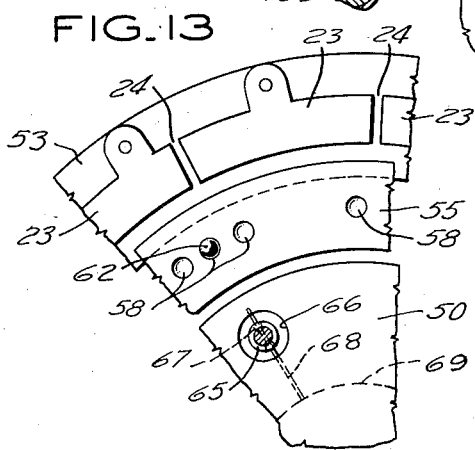
Fig. 13 is a view similar to Fig. 11 but showing the parts in still another position.

The wire 68 will drive the carrier, without itself flexing, when the detent 62 is not engaged in any identation 58 but when the detent is engaged in an indentation, the wire flexes without moving pin 65 and is thus placed under stress, as shown in Fig. 12. While the wire flexes, a portion of the wall of hole 66 approaches pin 65, finally engaging it and moving the carrier with sufficient force to disengage the detent 67 from the indentation 58. When this occurs, the spring 68 relieves its stress by snapping pin 65 and the brush carrier ahead and causing the brush 22 to jump the gap between the adjacent ends of the two contact segments 23 and the foot dial 27 to jump into the position shown in Fig. 13. Thus, one resistor 16 is cut out of circuit with the measuring instrument and another resistor is almost instantaneously cut in.

Figure 11:
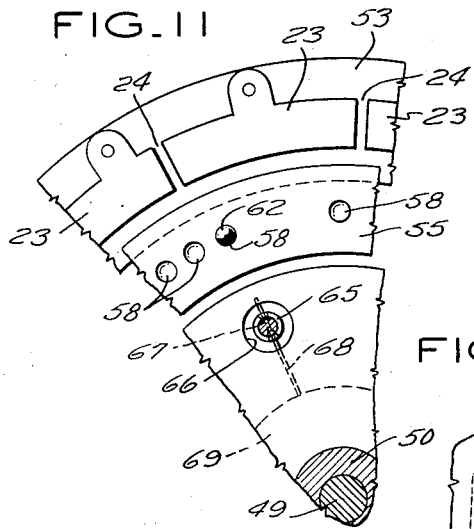
Fig. 11 is a fragmentary view taken similarly to Fig. 6 but showing the brush carrier driving means in another position.

In operation, assuming the tank is empty, the parts of the liquid level gauge and the switching mechanism will be in the positions illustrated. The brush 22 will be at the zero position engaged with the first or five foot contact 23. As previously explained the resistance core 16 at the three foot level will be connected in circuit with the measuring instrument 17. As liquid is forced into the storage tank the level-responsive element 2 activates the servo-motor 3 and the inch and foot level gauges. The brush 22 will move counterclockwise step by step along the five foot contact 23, being propelled by the spring wire 68. After the brush has moved five steps, the detent 62 will engage in the indentation 58 near the end of the first or five foot contact (see Fig. 11). When the level rises above the five foot mark and thus totally immerses the next longer resistance coil at that level, the first action will be to stress spring 68 (Fig. 12) and, when this has been effected, a portion of the wall of hole 66 will engage pin 65 and move the same and the brush carrier to move the detent 62 out of its indentation 58. Thereupon, the stressed spring snaps the brush 22 across the gap from the first to the second contact to the position as in Fig. 13. The resistor 16 at the five foot tank level is connected in circuit for readings at the five to seven foot levels. The detent 62 then becomes engaged with the first indentation 58 of the five to seven foot or second contact at a six foot position. Should the level continue to rise, the spring will be stressed and the brush carrier moved to disengage the detent 62 from the six foot indentation 58 and allow the spring to snap it forward to the seven foot position in which the detent engages with another indentation 58. A further rise in level will cause the brush to bridge the gap to the next contact connecting the next higher totally immersed resistor 16 in circuit and so on. If, however, while the carrier 60 and brush 22 were in the six foot position, the liquid level should drop one foot the spring 68 would again be stressed but in the reverse direction, another portion of the wall of hole 66 would engage pin 65 and cause the detent 62 to be disengaged from the six foot indentation 58, thus enabling the spring 68 to suddenly move brush 22 counterclockwise to the five foot contact position.

It will thus be seen that the switch mechanism of this invention of the simple brush and multiple contacts type is provided with spring means to cause the brush to move practically instantaneously without any dwell across the gap between a pair of contacts so that one resistor may be cut out of circuit with the measuring instrument and another cut in almost instantaneously thereafter without any noticeable effect on the measuring instrument.

What is claimed is:

1. Switch actuating mechanism, comprising a stationary support, a circular series of contacts mounted spaced one from another on said support, a circular track on said support having pairs of indentations therein, the indentations of each pair located one near an end of one contact of the series and the other near the adjacent end of the next succeeding contact of the series, a carrier, a brush mounted on the carrier and movable over said contacts, a detent mounted in the carrier and riding on said track in the path of said detents, a driving disk having a recess therein, a pin fixed to the carrier and projecting through said recess, said pin being smaller in diameter than the width of the recess, and a spring wire fixed at its inner end to said disk and engaged at its other end in said pin, said wire being capable of rotating said carrier without flexing itself, whenever the detent rides on the track between the indentations but incapable of moving the carrier to force the detent out of an indentation, the detent being moved out of an indentation by the abutment of one wall of said recess with said pin, whereby the spring, previously stressed by the last-named movement, snaps the brush across the gap between successive contacts.

2. The combination, as claimed in claim 1, in which the detent is an element spring-pressed against the track and a second element engages the track at a diametrically opposite location to balance the carrier.

References Cited in the file of this patent

UNITED STATES PATENTS

| | | |
|---|---|---|
| 2,163,919 | Siegel | June 27, 1939 |
| 2,273,317 | Parker | Feb. 17, 1942 |
| 2,560,002 | Sealey | July 10, 1951 |
| 2,625,043 | Tapp et al. | Jan. 13, 1953 |
| 2,774,830 | Sealey | Dec. 18, 1956 |

FOREIGN PATENTS

| | | |
|---|---|---|
| 730,971 | France | May 24, 1932 |